United States Patent [19]

Henning

[11] Patent Number: 4,915,207

[45] Date of Patent: Apr. 10, 1990

[54] SAFETY DOOR FOR THE HANDRAIL-ENERGY OF AN ESCALATOR

[75] Inventor: Gunter Henning, Oststeinbek, Fed. Rep. of Germany

[73] Assignee: Thyssen-M.A.N. Aufzüge GmbH, Neuhausen/Filder, Fed. Rep. of Germany

[21] Appl. No.: 297,569

[22] Filed: Jan. 17, 1989

[30] Foreign Application Priority Data

Feb. 2, 1988 [DE] Fed. Rep. of Germany ....... 3802983

[51] Int. Cl.[4] ............................................... B65G 43/00

[52] U.S. Cl. ..................................................... 198/323

[58] Field of Search .......................................... 198/323

[56] References Cited

U.S. PATENT DOCUMENTS

| | | | |
|---|---|---|---|
| 2,846,045 | 8/1958 | Fowler | 198/323 |
| 2,848,093 | 8/1958 | Etten | 198/323 |
| 3,809,206 | 5/1974 | Bredehorn et al. | 198/323 |
| 3,835,977 | 9/1974 | Hewitt et al. | 198/323 |
| 3,934,699 | 1/1976 | Seito et al. | 198/323 |
| 4,476,971 | 10/1984 | Schoneweiss | 198/323 |
| 4,619,355 | 10/1986 | Adrian et al. | 198/323 |

FOREIGN PATENT DOCUMENTS

| | | | |
|---|---|---|---|
| 1135145 | 8/1962 | Fed. Rep. of Germany | 198/323 |
| 2054640 | 3/1976 | Fed. Rep. of Germany . | |
| 0061088 | 5/1977 | Japan | 198/323 |

*Primary Examiner*—Robert J. Spar
*Assistant Examiner*—James R. Bidwell
*Attorney, Agent, or Firm*—Walter C. Farley

[57] ABSTRACT

A safety door at the entry of the handrail of an escalator into the housing which encloses the handrail mechanism has double door wings. The outer doors are stopped by a latch slider pressed down by the inner wings over ramps. The slider rests by way of a central guide pin extending in the sliding direction in a guide mounted on the entry wall.

6 Claims, 1 Drawing Sheet

SAFETY DOOR FOR THE HANDRAIL-ENERGY OF AN ESCALATOR

The invention relates to a safety door at the entry of a handrail of an escalator into the housing which encloses the escalator mechanism.

BACKGROUND OF THE INVENTION

A door at an escalator handrail entry is known from German Pat. No. 20 54 640, the content of which is hereby incorporated by reference. The U.S. counterpart of this German Patent is U.S. Pat. No. 3,809,206. It secures the entry of the handrail of an escalator against the danger of dragging in objects, particularly the hands of playing children. If a child grabs the handrail but does not le go in time, then the fingers together with the handrail move against the door, namely against its rear wings which open elastically by forcing away a slider by acting against inclined cam surfaces or ramps. Thereby the front door wings are unlocked also and offer a large opening into which all of the arm can extend without injury until the escalator, turned OFF as the door wings are opened, comes to a stop. The most important requirements of this design therefore are that the door shall open even upon weak contact and shall reliably shut off the escalator. Essentially this means that the slider carrying out this function must operate reliably.

Unfortunately, in this known design, such reliability is not unfailing. The slider rests against springs in the direction of push at both its ends and is guided by guide rods. This kind of slider guidance may appear appropriate at first thought, the more so because the slider is very wide and thereby is secured against rotation. It has been found, however, that this kind of slider guidance also entails a risk of jamming that might inhibit the design function and might lead to injury, especially to the arms of children.

SUMMARY OF THE INVENTION

The object of the present invention is to improve a safety door for the inlet or entry of an escalator handrail which is improved particularly with regard to its reliability, in particular the slider design.

Briefly described, the invention includes a safety door assembly at the entry opening of an escalator handrail where the handrail passes into a handrail housing, the door comprising first and second pairs of pivotally mounted, openable wings mounted on an entry wall on opposite sides of the entry opening, each pair of wings including an inner wing and an outer wing mounted on a common hinge pin and being sequentially inwardly pivotable between a closed position and an open position. Each of the wings has a recess at the distal edge thereof to permit passage of the handrail with the wings in their closed positions, the inner wing of each pair having a smaller recess than its associated outer wing. A slider having inclined surfaces extending upwardly and away from said entry wall is mounted under the wings. A slider support holds the slider below the wings for reciprocatory movement in directions parallel to the hinge pins with the inclined surfaces in position to be contacted by the wings and urged downwardly as the wings are opened. The slider support includes a guide support mounted on the entry wall below the wings, a central guide pin attached to the lateral center of the slider and slidably extending into the guide support, and spring means urging the slider upwardly toward the wings. A safety switch, operable by the slider as the slider is urged downwardly by contact of the wings with the inclined surfaces, is electrically connected to deenergize the escalator when operated.

In the design of the invention, the slider is mounted on a central guide pin. Only a central support position was found adequate to properly guide the slider. Experiment in particular has shown that thereby the risk of jamming can be entirely eliminated. Even if the door were to open only at one side, that is when only one of the pairs of wings opens so that the slider shall be forced away on one side, jam-free operation is assured, and this with higher reliability than in the known design. There is no need to fear slider rotation about the axis of the guide pin because, in the same function as in the known design, the wide slider cannot rotate relative to the entry wall against which it is resting. Another advantage of this design is its substantial simplification. The entire slider can be made at one time and in a single piece by injection-molding.

Slider rotation about the axis of the guide-pin is additionally prevented by making the guide polygonal and the pin similarly shaped, and this prevention is also the case when the slider is mounted a slight distance away from the entry wall so that it is no longer resting non-rotationally against it.

Stop means formed on the slider prevent the wings from moving beyond the slider ends in the event of excessive opening of the door wings and possibly slipping beyond it, whereby jamming might ensue. The design reliability is further enhanced thereby.

Mounting the safety switch on the pin guide acts to simplify the support for the safety switch since the guide for the guide-pin is present at the entry wall anyway.

BRIEF DESCRIPTION OF THE DRAWINGS

The drawings show the invention in illustrative and schematic manner.

DESCRIPTION OF THE PREFERRED EMBODIMENT

Figure 1:
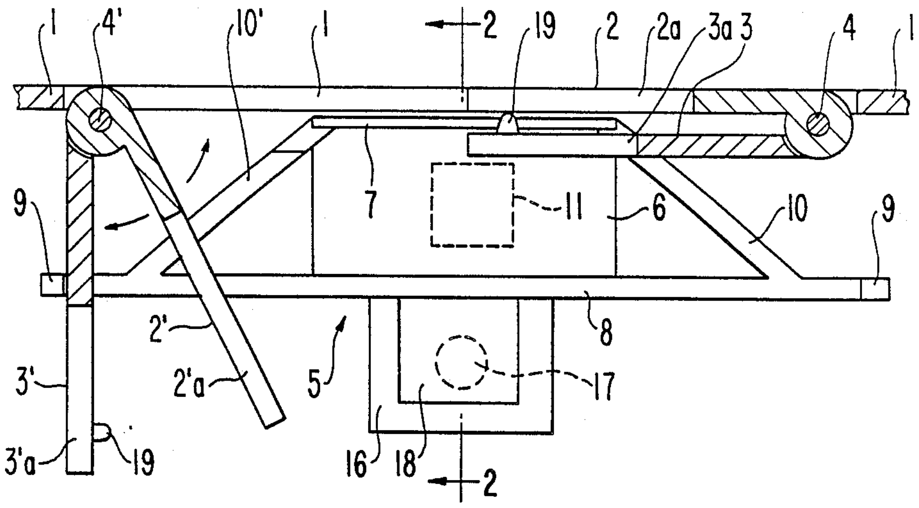
FIG. 1 is a top plan view of the slider, seen in cross-section along line 1—1 of FIG. 2.
Figure 2:
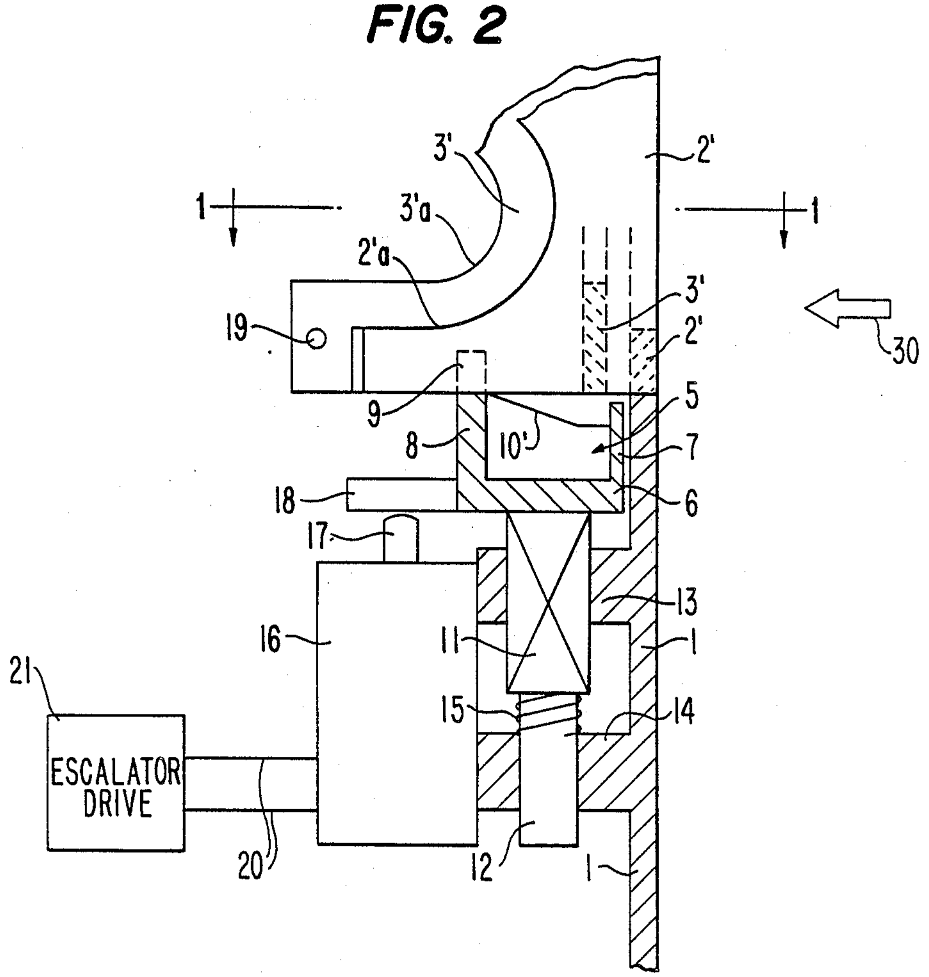
FIG. 2 is a section along line 2—2 of FIG. 1.

Reference is made to the German Pat. No. 20 54 640 for the basic operation of the design being considered. This operation is summarized below:

The handrail of an escalator (not shown) passes through the shown safety-door into the entry wall 1 of the breast or front end of the housing which contains some of the escalator mechanism and which receives the unexposed part of the handrail, that is from top to bottom in FIG. 1 and from right to left in FIG. 2, the center line of the handrail being approximately on the line 2—2 in FIG. 1 and approximately on the line 1—1 in FIG. 2.

Within the scope of the design shown, the handrail is enclosed by the door wings 2,2' and 3,3' which are, respectively, the outer and inner wings. The door wings in each case are supported at one end in common on spindles 4,4' of the entry wall 1. The distal ends of the wings have recesses or partial openings **2*a*,2'*a* and 3*a*,3'*a* which provide clearance for the handrail which they substantially enclose. The clearance of the inner wings 3,3' is selected to be narrower, while that of the outer wings 2,2'** spaced from the handrail is somewhat larger. As a result, and as discussed in further detail in the German Pat. No. 20 54 640, objects resting on the handrail, for instance the fingers of children, first move against the inner wings 3,3'.

A slider 5 is provided below the wings 2,3 on the inside of the entry wall 1 and preferably is a unitarily formed, injection-molded plastic component.

The slider 5 comprises a base plate 6 on which the edge facing the entry wall 1 has an upstanding wall 7 which forms a latch. Parallel thereto a second upstanding wall is provided at the opposite edge of the base plate 6, away from the entry wall, laterally projecting above this base plate and forming a wide beam 8 of which the plane surface comprises stop means 9 rising at the ends. Diagonal ramps 10,10 extend from the ends of the latch wall 7 to the beam 8. The upper edges of the ramps 10,10' rise from the latch wall 7 to the beam 8 as shown in FIG. 2.

A square pin 11 is centrally mounted underneath base plate 6 and has an extension 12 having a smaller cross-section. The square pin 11 slidably extends through a square bore of an upper guide 13 attached to the rear surface of entry wall 1. The extension is slidably received in a lower guide 14. A helical spring 15 encloses the extension 12 and supports the lower end of the square pin 11 relative to the lower guide 14 and thereby urges the slider 5 upwardly.

A safety switch 16 is mounted on the distal ends of guides 13,14 away from the entry wall 1 and its actuator 17 is controlled by a stop 18 formed on slider 5 as a rearward extension of base plate 6. Safety switch 16 is connected by conductors to the escalator drive power 21 so that when the actuator 17 is depressed, the power to the escalator drive is shut off.

The shown safety-door operates as follows:

FIG. 1 shows the wings 2,3 on one side in their closed position. The wings 2',3' on the other side are open. If all wings were closed, a space still would be present between them on account of the spacers 19, and the slider would move somewhat upward relative to the position shown in FIG. 2 such that the latch 7 would extend up behind the outer wings 2,2' and lock them. The inner wings 3,3' then would rest on the inclined upper surfaces of the ramps 10,10' at the latch-side end. This is shown more clearly in FIG. 2 by the dashed, closed positions of the wings 2',3'.

If now a force is exerted in the direction of advance of the handrail, that is in the direction of arrow 30 in FIG. 2, from right to left, on at least one of the inner wings, illustratively the wing 3', then this wing 3', which is not blocked by the latch 7, can move over the upwardly inclined top surface of the ramp 10', whereby it forces down the slider 5 by a cam action until the wing arrives at the beam 8. The slider 5 then is in its lowest position as shown in FIG. 2. The latch 7 now is disengaged, and the outer wings 2,2'also may swing inwardly.

The moment the slider 5 moves down, its stop 18 engages the actuator 17 of the safety switch 16 and turns OFF the escalator power.

Proper operation of the slider 5 requires that it be guided reliably without jamming. This is achieved by the central slide-guide with the square pin 11 in the mating opening in guide 13 and the guidance of the extension 12 of the pin in the opening through guide 14. Even when the door wings are opened on one side only, as shown in FIG. 1, that is when the slider 5 is loaded obliquely only at one end of the beam 8, jamming-free guidance is assured thereby. The stops 9 at the beam ends limit the opening motion of the inner wings 3,3', as shown in FIG. 1 by the illustration of the wing 3', to prevent excessive opening of the door wings in which they might leave the beam 8.

What is claimed is:

1. A safety door at the entry opening of an escalator handrail into the handrail housing comprising first and second pairs of pivotally mounted openable wings mounted on an entry wall on opposite sides of the entry opening, each pair of wings including an inner wing and an outer wing mounted on a common hinge pin and being sequentially inwardly pivotable between a closed position and an open position, said wings having recesses at the distal edges thereof to permit passage of the handrail with the wings in their closed positions;

a slider having inclined surfaces extending upwardly and away from said entry wall;

means for supporting said slider below said wings for reciprocatory movement in directions parallel to said hinge pin with said inclined surfaces in position to be contacted by said wings and urged downwardly as said wings are opened, said means for supporting including a guide support mounted on said entry wall below said wings, a central guide pin attached to said slider at the lateral center thereof and slidably extending into said guide support, and spring means urging said slider upwardly toward said wings; and a safety switch operable by said slider as said slider is urged downwardly by contact of said wings with said inclined surfaces, said switch being electrically connected to deenergize said escalator when operated.

2. A safety door according to claim 1 wherein said guide support includes means defining a non-circular opening for receiving said guide pin, said guide pin having a matching non-circular cross section.

3. A safety door according to claim 2 wherein said slider further includes stop means at the lateral ends of said slider for limiting the angular extent to which said wings can pivot open.

4. A safety door according to claim 3 wherein said safety switch is mounted on said guide support.

5. A safety door according to claim 1 wherein said slider further includes stop means at the lateral ends of said slider for limiting the angular extent to which said wings can pivot open.

6. A safety door according to claim 1, wherein said inner wing of each pair has a smaller recess than its associated outer wing.

* * * * *